United States Patent [19]

Kato et al.

[11] Patent Number: 4,820,669

[45] Date of Patent: * Apr. 11, 1989

[54] PROCESS FOR PREPARING POWDERED CERAMIC RAW MATERIALS OF COMPLEX OXIDE

[75] Inventors: Yoshiharu Kato; Shinsei Okabe, both of Takatsuki; Shozo Kojima, Nagaokakyo; Yasunobu Yoneda, Kyoto, all of Japan

[73] Assignee: Murata Manufacturing Co., Ltd., Japan

[ * ] Notice: The portion of the term of this patent subsequent to Aug. 27, 2002 has been disclaimed.

[21] Appl. No.: 856,038

[22] Filed: Apr. 25, 1986

[30] Foreign Application Priority Data

Apr. 30, 1985 [JP] Japan ................................. 60-94078

[51] Int. Cl.$^4$ .............................................. C04B 35/46
[52] U.S. Cl. ........................................ 501/134; 264/56; 501/135; 501/136; 501/137
[58] Field of Search ............................... 501/134–137, 501/138–139, 1, 152; 502/320; 264/56

[56] References Cited

U.S. PATENT DOCUMENTS 3,983,077 9/1976 Fuller et al. ...................... 501/137
4,537,865 8/1985 Okabe et al. ...................... 501/135
4,624,808 11/1986 Lange ..................................... 501/1

OTHER PUBLICATIONS

"Reactive Powders from Solution ", D. W. Johnson & P. K. Gallagher in *Ceramic Processing Before Firing*, Eds. Onoda and Hench, John Wiley & Sons, N.Y. 1978, pp. 134–135.

*Primary Examiner*—William R. Dixon, Jr.
*Assistant Examiner*—Andrew Griffis
*Attorney, Agent, or Firm*—Ostrolenk, Faber, Gerb & Soffen

[57] ABSTRACT

A process for preparing a powdered ceramic raw material comprises the steps of (a) adding ammonia gas or an alkali to a first aqueous solution containing a water-soluble salt of lead capable of being precipitated as a hydroxide until the pH of the first solution reaches a value within the range of 9 to 10 to form a precipitate of lead hydroxide;

(b) adding ammonia gas or alkali to a second aqueous solution containing at least one water-soluble salt or ceramic components other than lead capable of being precipitated as a hydroxide until the pH of the second solution reaches a value within the range of 9 to 10 to form a precipitate of hydroxide of said ceramic components;

(c) mixing the resulting reaction mixtures, followed by separation of the precipitates of hydroxides from solution, washing with water and drying; and (d) calcining the precipitate to form complex oxides of said ceramic material.

11 Claims, No Drawings

PROCESS FOR PREPARING POWDERED CERAMIC RAW MATERIALS OF COMPLEX OXIDE

FIELD OF THE INVENTION

This invention relates to a process for preparing powdered ceramic raw materials of complex oxide with a fine grain size.

With an increasing demand for miniaturization of electronic devices, efforts are being made to miniaturize the electronic components to be incorporated in such devices. For ceramic capacitors, investigations are being undertaken for producing dielectric ceramics with a large dielectric constant. In the present stage of the related art technology, however, it is impossible to achieve a considerable increase in the dielectric constant. Thus, the most practical approach to miniaturize ceramic capacitors is to decrease the thickness of dielectric ceramics. However, the decrease in the thickness alone causes increase in a dielectric loss and increase in variation of capacitance with change in an applied DC or AC biasing voltage. In addition, when a ceramic capacitor is made of a ceramic body having a large crystal grain size, for example, of the order of 8 $\mu m$, it possesses a low breakdown voltage because of presence of relatively large pores with a size of as large as 20 $\mu m$ at the grain boundaries.

In order to decrease the thickness of ceramic capacitors with no deterioration in performance, it is therefore required to use a ceramic body with a fine grain size. The smaller the crystal grain size, the smaller the size of the pores present at grain boundaries, thus making it possible to improve the breakdown voltage of the capacitor. In addition, if the ceramic body could have a grain size approximately equal to the thickness of the transition region in spin orientation, i.e., the domain wall, which is 0.6 $\mu m$, the cubic-tetragonal transition which takes place when a sintered ceramic body is cooled from its elevated sintering temperature to a low temperature during sintering process would be lessened. If the transition could be lessened, it would be possible to improve aging characteristics of capacitors. Here, a change in capacitance that takes place with elapse of time is defined as the aging characteristic. In addition, the ratio of the c-axis to a-axis of the ceramic crystals would take a value approximately equal to 1.00, thus reducing the change in capacitance with change in the applied DC or AC bias voltage. Also, improvement in a mechanical strength would be expected by reducing the number and size of the pores.

For these ends there have been proposed two processes, i.e., an oxalate method and an alkoxide method. The essentials of the oxalate method are first to precipitate an oxalate of ceramic components, for example, barium titanyl oxalate [$BaTiO(C_2O_4) \cdot 4H_2O$], and then thermally decompose the precipitate at a temperature of 700° C. to form $BaTiO_3$.

However, it is impossible with the oxalate method to prepare oxalates of ceramic components except for barium titanyl oxalate. This makes it impossible to produce multi-component ceramics which are most widely used in industry by the oxalate method.

The alkoxide method involves difficulty in preparing alkoxides of various ceramic components and the alkoxides that could be obtained become very expensive. In addition, since organic solvent vapor and air form a explosive mixture, extreme precaution is necessary to prevent a solvent vapor formation.

In order to prepare a ceramic raw material with a fine grain size, it is necessary to satisfy the following requirements:

(1) to prepare primary particles of all the ceramic components for a composite system by a liquid phase reaction;

(2) to mix the primary particles of all the ceramic components in solution to prevent them from agglomeration;

(3) to granulate the fine primary particles before compacting to reduce the amount of a binder to be used;

(4) to prevent the particles from the grain growth which takes place during sintering; and, (5) to produce a desired ceramic raw material safely and at low cost.

However, none of the conventional processes can satisfy all the requirements mentioned above at the same time.

On the other hand, there have been proposed a variety of processes which include the steps of preliminary adding an alkali to a solution of one or more compounds of other ceramic components such as Pb, Zr, Ti or La before precipitating all the ceramic components. These process are summarized as follows.

(1) The first process comprises the steps of adding alkali to an aqueous solution of a lead compound to form a precipitate of lead hydroxide, adding a solution of one or more compounds of other ceramic components such as Zr, Ti and La to the solution containing lead hydroxide and then adding alkali to the resulting mixture;

(2) The second process comprises the steps of adding alkali to a solution of a lead compound to form a precipitate of lead hydroxide, adding an excess amount of alkali and then a solution of one or more compounds of other ceramic components such as Zr, Ti and La to the solution containing lead hydroxide;

(3) The third process comprises the steps of adding alkali to a solution of one or more nitrates or chlorides of ceramic components such as Zr, Ti and La to form their precipitates, adding a solution of a lead compound and then alkali to the resulting mixture;

(4) The fourth process comprises the steps of adding alkali to a solution of one or more nitrates or chlorides of ceramic components such as Zr, Ti and La to form their precipitates, adding an excess amount of alkali to the above solution, and then adding a solution of a lead compound to the resulting mixture;

(5) The fifth process comprises the steps of adding alkali to a solution of one or more nitrates or chlorides of ceramic components such as Pb, Zr and La to form their precipitates, adding a solution of a titanium compound to the above solution, and then adding alkali to the resulting mixture; and, (6) A sixth process comprises the steps of adding alkali to a solution of one or more nitrates or chlorides of ceramic components such as Pb, Zr and La to form their precipitates, adding an excess amount of alkali, and then adding a solution of $TiCl_4$ to the resulting solution.

It is, however, impossible with these processes to avoid formation of a precipitate of $PbCl_2$ or $Pb(OH)_2$. $PbCl_2$ in the final mixed solution. For example, in the processes of (1) and (5), lead is firstly precipitated as $Pb(OH)_2$, which is then dissolved and precipitated as $PbCl_2$ by the addition of a solution of $TiCl_2$ since the solution is made acidic with $TiCl_2$. In the processes (2)

and (6), the precipitate of $Pb(OH)_2$ is dissolved by an addition of an excess amount of alkali such as NaOH, and is reprecipitated in the form of $PbCl_2$. This phenomenon may be avoided by dilution with water, but it is impossible to put it into practical use since it required a large amount of water. In the process (3), precipitation of $PbCl_2$ and $Pb(OH)_2 \cdot PbCl_2$ occurs when a solution containing Pb is added to the solution containing precipitates of Zr, Ti and La since it contains alkali in an amount required for the precipitates of Ti, Zr and La. In the processes (3) and (4), Pb reacts with NaCl and $NH_4Cl$ to form $PbCl_2$ when the solution containing Pb is added to the solution containing precipitate of $Ti(OH)_2$.

If the precipitates containing $PbCl_2$ is used as a raw material, $PbCl_2$ is evaporated from compacts of particles during calcining and subsequent sintering, resulting in change in molar ratio of Pb in ceramic bodies.

It is therefore an object of the present invention to provide a process for preparing a powdered ceramic raw material with fine grain size which overcomes the aforesaid disadvantages and makes it possible to manufacture ceramic capacitors which are small in size but large in capacitance.

SUMMARY OF THE INVENTION

According to the present invention, there is provided a process for preparing a powdered ceramic raw material comprising the steps of:

(a) adding ammonia gas or an alkali to the first aqueous solution containing a water-soluble salt of lead capable of being precipitated as a hydroxide or lead oxide until the pH of the first solution to reaches a predetermined value within the range of 9 to 10 to form a precipitate of lead hydroxide in the form of colloidal primary particles;

(b) adding ammonia gas or alkali to the second aqueous solution containing at least one water-soluble salt of ceramic components other then lead capable of being precipitated as a hydroxide until the pH of the second solution reaches to a predetermined value within the range of 9 to 10 to form a precipitate of hydroxide of said ceramic components in the form of colloidal primary particles;

(c) mixing the reaction mixtures resulting from the first aqueous solution and the reaction mixtures resulting from the second aqueous solution, followed by separation of the precipitates of hydroxides from solution, washing with water and drying; and (d) treating the precipitate with heat to form complex oxides of said ceramic components.

As the water-soluble salts of lead, there may be used those such as lead nitrate, lead acetate and lead chloride. When lead chloride is used, the aqueous solution of lead chloride must be maintained at a temperature ranging from 40° to 90° C., during addition of ammonia gas or an alkali to prevent the precipitation of lead chloride.

As the water-soluble salts of ceramic components other than lead, there may be used those such as nitrates or chlorides or oxynitrates or oxychlorides of elements selected from the group consisting of Ti, Zr and Sn.

In a preferred embodiment, the second aqueous solution contains one or more additives dissolved therein as an additional component of the ceramics to improve their electric characteristics. Preferred additives are Nb, Y, rare earth elements, Mn, Al, Si, Bi and Zn. Among them, Nb, Y and rare earth elements serve as a grain growth inhibitor and contribute to inhibit grain growth during sintering. The addition of these inhibitors makes it possible to produce ceramic bodies with a grain size of not more than 1 μm.

The rare earth elements also serves as a depressor which makes it possible to produce dielectric ceramics with flat temperature characteristics of dielectric constant. Among them, Ce and Nd are not so effective for flattening of the temperature characteristics, but are effective for improvement in dielectric constant. Lanthanum (La) and niobium (Nb) are effective for flattening of the temperature characteristics of dielectric constant, and for this purpose, Nb is particularly effective. Niobium occurs as a mixture with tantalum (Ta), but tantalum as an impurity does not impair the effectiveness of Nb. Thus, a mixture of Ta and Nb may be used as the additive in the present invention.

In the above additives, the elements Mn, Al, Si, Bi and Zn serve as a mineralizer. Other elements such as Fe, Cr, Co and Cu may be used as a mineralizer in the present invention. When silicon (Si) is used as a mineralizer, it is preferred to use it in the form of a solution of water glass. This solution may be added to the precipitant to be added to the second aqueous solution.

In the above process, the precipitation of lead hydroxide is carried out separate from that of hydroxides of Ti, Zr and Sn. The reason is that if a solution of lead compound is mixed with the second aqueous solution containing nitrates or chlorides of other elements, for example, $TiCl_4$ or $ZrOCl_2$, lead precipitates in the form of $PbCl_2$, thus making it impossible to obtain precipitate in the form of lead hydroxide.

When manganese (Mn) is incorporated into the second aqueous solution as an additional ceramic component, care must be taken not to use it in the presence of ammonium ions ($NH_4^{++}$). If the ammonium ions are present in the solution, Mn forms a complex salt, thus making it impossible to form a precipitate of manganese in the form of a hydroxide. Thus, ammonium carbonate or ammonium hydroxide should not be used as the precipitant to be added to the first or second solution when Mn is used as a component of the ceramic raw material.

The alkali used as the precipitant may be a hydroxide of alkaline metals such as sodium and potassium. The alkali is generally added to the first and second solutions in the form of an aqueous solution.

DETAILED DESCRIPTION OF THE INVENTION

According to the present invention, ceramic components are respectively dissolved in a suitable amount of water and then poured in the first or second vessels in the predetermined proportions to prepare the first aqueous solution of lead compound and the second aqueous solution containing one or more water-soluble salts of ceramic components other than lead.

In the first and second steps (a) and (b), the respective ceramic components are precipitated in the form of colloidal particles of hydroxides by adding ammonia gas or an alkali solution. After thorough precipitation, the reaction mixtures containing the precipitates are mixed in the third step (c) to provide a mixture composed of primary particles which are adjacent to one another.

In the subsequent steps, a mixture of the precipitates is separated from the solution, washed with water, and then dried to provide an active raw material in the form of colloidal particles, which has a particle size distribution ranging from about 0.01 to 0.02 μm.

In the fourth step (d), the mixture is treated with heat or calcined to provide a ceramic raw material containing the ceramic components in the predetermined proportions. During calcining, agglomeration of the primary particles takes place to form secondary particles. This agglomeration contributes to decrease the specific surface area (m²/gr) of the particles, thus making it possible to reduce the amount of a binder required for making a ceramic green sheet, which in turn contributes to decrease shrinkage of ceramic products that occurs during firing. The thus prepared secondary particle consists of a mixture of the primary particles of the respective components. The agglomeration of primary particles is harmless to the purpose of producing ceramic products with fine grain size. This is supported by the fact that sintered ceramic bodies resulting from the ceramic raw material have a fine grain size of about 1–2 μm.

The calcination is preferably carried out at a temperature within the range of 600° to 1,200° C. If the calcining temperature is less than 600° C., the desired ceramic raw materials is not synthesized. If the calcining temperature is more than 1,200° C., the agglomeration to secondary particles becomes excessive.

In the second vessel, the pH of the second solution should be adjusted to a value within the range of 9 to 10. If the pH is outside of this range, the ceramic components dissolve in the solution and fail to form the precipitate of hydroxides. The pH of the first solution in the first vessel is preferably adjusted to a value equal to that of the second solution in the second vessel. If the pH of the first solution differs from that of the other, the pH value of the second solution varies with the pH of the first solution, resulting in dissolution of the hydroxide precipitated in the second vessel.

If necessary, an aqueous solution of hydrogen peroxide ($H_2O_2$) may be added to the first and second solutions as a stabilizer to prevent the solution from hydrolysis. For example, if hydrogen peroxide is added to the solution, the elements dissolved therein, for example, Pb, Ti, Zr, Ce and Mn can be precipitated in the form of PbO, $Ti(OOH)(OH)_3$, $Zr(OOH)(OH)_3$, $Ce(OH)_3$, and $Mn(OH)_4$, respectively. Such precipitates have the advantage of facilitating filtration and washing operations in the subsequent steps.

The investigations on a molar ratio of A to B in the $ABO_3$ complex oxide revealed that the crystal grain size increases and porosity appears on grain boundaries as the content of B increases. Thus, a preferred molar ratio of A to B is in the range of from 1.00:1.00 to 1.00:1.05.

According to the present invention, it is possible to produce a powdered ceramic raw material with a fine grain size and a desired proportion of constituents.

These and other objects, features and advantages of the present invention will become more apparent from the following description with reference to examples.

EXAMPLE 1

In the first vessel, an aqueous solution of lead acetate was prepared by dissolving 1.000 mole of lead acetate ($Pb(CH_3CO_2)_2$) in 3 liters of warm water. Added to this first aqueous solution were 15 ml of 30% hydrogen peroxide as a stabilizer and then an aqueous solution of sodium hydroxide (NaOH) until the pH of the resulting solution reached a value ranging from 9 to 10 to precipitate lead hydroxide.

In the second vessel, the second aqueous solution containing zirconium oxychloride, titanium chloride and manganese chloride was prepared by mixing an aqueous solution of 0.385 mole of zirconium oxychloride ($ZrOCl_2 \cdot 8H_2O$), an aqueous solution of 0.495 mole of titanium chloride ($TiCl_4$), and an aqueous solution of 0.120 mole of manganese chloride ($MnCl_2$) and adding water up to 4 liters. Added to the second solution were 15 ml of 30% hydrogen peroxide as a stabilizer and then an aqueous solution of sodium hydroxide (NaOH) until the pH of the resulting solution reached a value ranging from 9 to 10 to precipitate hydroxides of Zr, Ti and Mn.

The resulting reaction products prepared in the first and second vessels were mixed, separated from the solution by filtration and then washed with water. The filter cake was milled with a ball mill, filtered and then dried. There was obtained fine powder having a particle size distribution ranging from 0.01 to 0.02 μm for the individual particles.

The powder was treated with heat at 640° C. for 1 hour and then crushed to prepare a calcined powder of ceramic raw material. Analysis of the calcined power showed that it has a composition $Pb(Ti_{0.495}Zr_{0.385}Mn_{0.120})O_3$.

The thus obtained powder of ceramic raw material was granulated with a binder, formed into disks with a diameter of 10 mm and a thickness of 1 mm under a pressure of 1,000 Kg/cm², and then fired at 1150° C. for 2 hours to prepare ceramic disks.

The ceramic disk was provided with silver electrodes by applying silver paste to both its sides and then baking the same at 800° C. for 30 minutes. The ceramic disk was placed in an insulating oil and then polarized by applying a DC voltage of 4KV/mm between opposed electrodes to prepare specimens. Microscope observation showed that the dielectric ceramic has a grain size distribution ranging from 1 to 2 μm.

For the specimen, measurements were made on its dielectric constant ($\epsilon$), dielectric loss (tan δ), electromechanical coupling coefficient in radial expansion mode (Ks) and mechanical quality factor (Qm). The dielectric constant and dielectric loss were measured at 1 KHz and 1 V r.m.s. Results are shown in Table 1 together with those for a comparative specimen prepared by the conventional solid-state reaction.

The comparative specimen was prepared in the following manner: Powders of highly purified PbO, $TiO_2$, $ZrO_2$ and $MnO_2$ were weighed and mixed in the molar ratios so that the final product has a composition $Pb(Ti_{0.495}Zr_{0.385}Mn_{0.120})O_3$. The resulting mixture was milled by the wet process, dried and then calcined at 790° C. for 1 hour. The calcined body was crushed, milled, granulated with a binder and then fired at 1200° C. for 2 hours.

TABLE 1

| properties | Example 1 | Comparative example |
|---|---|---|
| $\epsilon$ | 1546 | 1373 |
| tan δ | 0.26% | 1.00% |
| Ks | 48.0% | 27.2% |
| Qm | 2764 | 1007 |

EXAMPLE 2

In the first vessel, an aqueous solution of lead nitrate was prepared by dissolving 1.000 mole of lead nitrate ($Pb(NO_3)_2$) in 3 liters of warm water. After adding 15 ml of 30% hydrogen peroxide as a stabilizer, to the aqueous solution was added an aqueous solution of sodium hydroxide (NaOH) until the pH reached a value ranging from 9 to 10 to precipitate lead hydroxide.

Separate from the above, the second aqueous solution was prepared by mixing an aqueous solution of 0.385 mole zirconium oxynitrate (ZrO(NO$_3$)$_2$), an aqueous solution containing 0.495 mole of titanium chloride (TiCl$_4$), and an aqueous solution containing 0.120 mole of manganese nitrate (Mn(NO$_3$)$_2$) and then adding water up to 4 liters. After adding 15 ml of 30% hydrogen peroxide as a stabilizer to, the second aqueous solution was added an aqueous solution of sodium hydroxide (NaOH) until the pH reached a value ranging from 9 to 10 to precipitate hydroxides of Zr, Ti and Mn.

The resulting reaction products prepared in the first and second vessels were mixed and then treated in the same manner as in Example 1 to prepare a mixture of hydroxides of Pb, Zr, Ti and Mn. The resulting mixture has a particle size distribution ranging from 0.01 to 0.02 μm.

The mixture was then treated with heat at 640° C. for 1 hour and then crushed to prepare calcined powder of a ceramic raw material. This calcined power has a composition Pb(Ti$_{0.495}$Zr$_{0.385}$MN$_{0.120}$)O$_3$.

Using this calcined powder of ceramic raw material, dielectric ceramic specimen was prepared in the same manner as in Example 1 and then subjected to measurements of dielectric characteristics. The measurements were made under the same conditions that used in Example 1. Microscope observation showed that the dielectric ceramic has a grain size distribution ranging from 1 to 2 μm.

Results are shown in Table 2 together with those for a comparative specimen prepared by the conventional solid-state reaction in the same manner as in Example 1.

TABLE 2

| properties | Example 2 | Comparative sample |
|---|---|---|
| ε | 1550 | 1373 |
| tan δ | 0.25% | 1.00% |
| Ks | 47.1% | 27.2% |
| Qm | 2805 | 1007 |

From the results shown in Tables 1 and 2, it will be seen that the process according to the present invention makes it possible to prepare powdered ceramic raw materials having a small particle size, which in turn makes it possible to decrease the thickness of dielectric ceramic bodies for ceramic capacitors.

What I claim is:

1. A process for preparing a powdered ceramic raw material of complex oxides comprising the steps of
    (a) adding ammonia gas or an alkali to a first aqueous solution containing a water soluble salt of lead capable of being precipitated as a hydroxide until the pH of the first solution reaches a value within the range of 9 to 10, thereby forming lead hydroxide;
    (b) adding ammonia gas or alkali to a second aqueous solution containing at least one compound selected from the group consisting of titanium chloride, zirconium chloride, tin chloride and tin nitrate until the pH of the second solution reaches a value within the range of 9 to 10, thereby forming at least one hydroxide of said elements;
    (c) combining the reaction mixture resulting from the first aqueous solution and the reaction mixture resulting from the second aqueous solution, filtering the combined mixtures, washing the resulting filter cake with water and drying the resulting filter cake; and
    (d) calcining the resulting filter cake to form complex oxides of said ceramic components.

2. The process according to claim 1 wherein the water-soluble salt of lead is lead chloride and wherein the first aqueous solution is at 40°–90° C. during addition of the ammonia gas or alkali.

3. The process according to claim 1 wherein a small amount of hydrogen peroxide is added to the first aqueous solution before addition of ammonia gas or alkali.

4. The process according to claim 1 wherein a small amount of hydrogen peroxide is added to the second aqueous solution before addition of ammonia gas or alkali.

5. The process according to claim 4 wherein a small amount of hydrogen peroxide is added to the first aqueous solution before addition of ammonia gas or alkali.

6. The process according to claim 5 wherein the second aqueous solution further contains at least one element selected from the group consisting of Nb, Y, rare earth elements, Mn, Al, Si and Zn.

7. The process according to claim 1 wherein the second aqueous solution further contains at least one element selected from the group consisting of Nb, Y, rare earth elements, Mn, Al, Si and Zn.

8. The process according to claim 1 wherein the lead salt is lead acetate and the second aqueous solution contains zirconium oxychloride, titanium chloride and manganese chloride.

9. The process according to claim 8 in which sodium hydroxide is used as the alkali in the (a) and (b) steps.

10. The process according to claim 1 in which the lead salt is lead nitrate and the second aqueous solution contains zirconium oxynitrate, titanium chloride and manganese nitrate.

11. The process according to claim 10 in which sodium hydroxide is used as the alkali in the (a) and (b) steps.

* * * * *